(No Model.) 2 Sheets—Sheet 1.

J. A. NORTON.
CORN HUSKING MACHINE.

No. 308,691. Patented Dec. 2, 1884.

Witnesses
C. C. Linthicum
Douglas Dyrenforth

Inventor
James A. Norton
By Banning & Banning
Attorneys

N. PETERS. Photo-Lithographer, Washington, D. C.

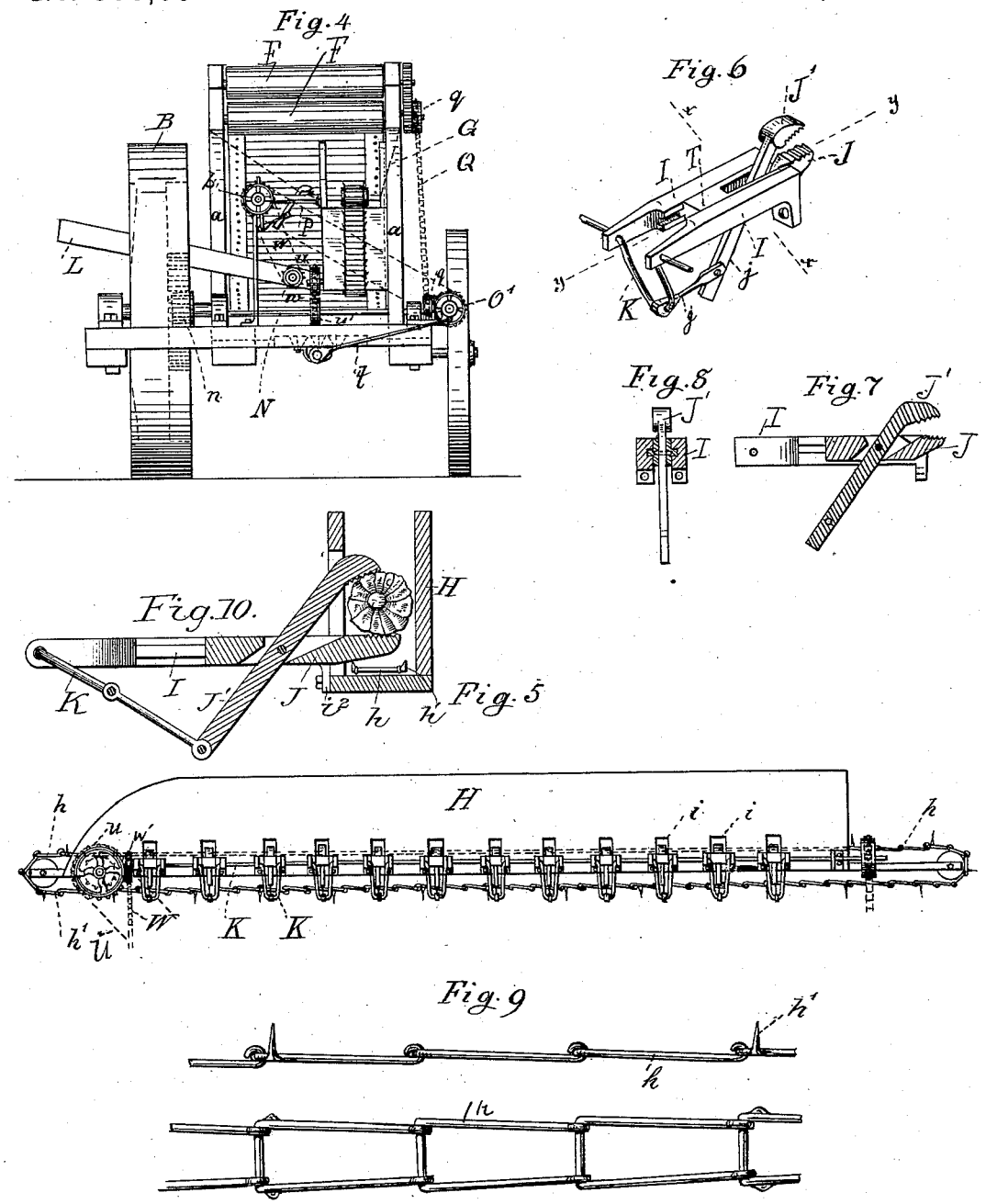

UNITED STATES PATENT OFFICE.

JAMES A. NORTON, OF WEST SIDE, IOWA, ASSIGNOR OF TWO-THIRDS TO FRANK J. GARY AND P. J. KING, BOTH OF SAME PLACE.

CORN-HUSKING MACHINE.

SPECIFICATION forming part of Letters Patent No. 308,691, dated December 2, 1884.

Application filed December 14, 1883. (No model.)

*To all whom it may concern:*

Be it known that I, JAMES A. NORTON, of West Side, Crawford county, Iowa, have invented certain new and useful Improvements in Corn-Husking Machines, of which the following is a specification.

My invention relates to a machine for husking corn which employs a knife or sickle for severing the stalks, aprons for carrying the stalks up to the stripping knives or rollers, knives or rollers, or both, for stripping the ears from the stalks, a conveyer for delivering the corn to the husking-jaws, husking-jaws for operating upon the ears, and an elevator for delivering the corn to a proper receptacle at the side of the machine; and it consists in certain improvements hereinafter described, and particularly pointed out in the claim.

Figure 1:
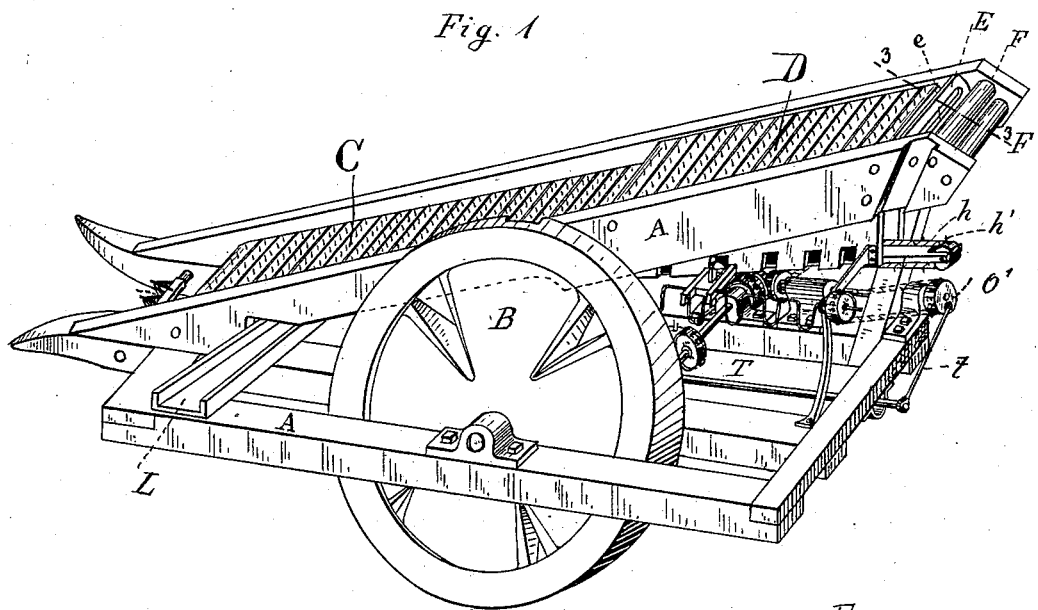
Figure 2:
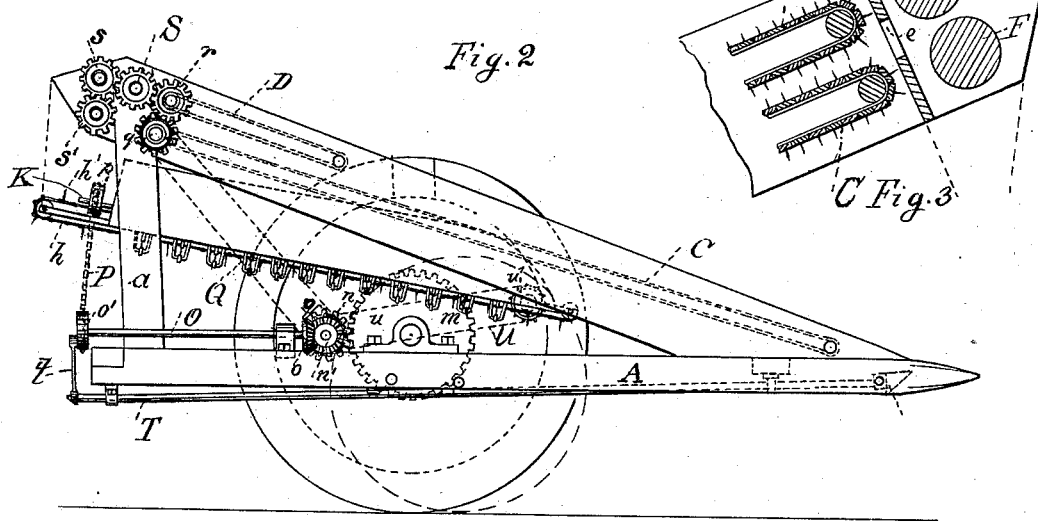
Figure 3:
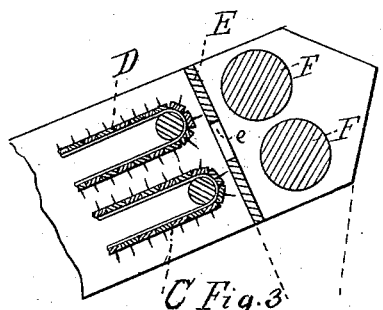

In the drawings, Figure 1 is a perspective view of the machine, particularly designed to show the frame-work for carrying the operative parts and the ground-wheel from which the power is taken to drive said operative parts. Fig. 2 is an elevation of the opposite side of the machine from that shown in Fig. 1, and particularly shows the gearing of the operative parts. Fig. 3 is a longitudinal section on the line 3 3 of Fig. 1. Fig. 4 is an elevation of the rear end of the machine. Fig. 5 is a side elevation of the conveyer for deliving the corn to the husking-jaws, also showing the husking-jaws attached to a crank-shaft at their rear ends, and showing also, partially in dotted lines, the chain working through the conveyer to carry the ears along the latter. Fig. 6 is a detail view of the husking-jaws. Fig. 7 is a section taken on line $y\,y$ of Fig. 6. Fig. 8 is a section taken on line $x\,x$ of Fig. 6. Fig. 9 comprises detail views of the chain $h\,h'$, shown in Fig. 5, and Fig. 10 is a transverse vertical section taken in the plane of one of the slots of the trough shown in Fig. 5.

The operative parts of the machine are supported by a frame-work, A A, carried by two ground-wheels, B B'. The tongue is connected to the left-hand corner of the frame-work when facing the direction in which the machine is driven. One row of corn is operated upon at a time. The stalks are severed by a sickle carried on the frame-work at the front of the machine and driven by mechanism hereinafter described. A reel may be employed to reel the stalks to the sickle. The stalks when severed fall upon an apron, C, the frame-work supporting which is carried by standards $a\,a$ on the main frame A.

Mounted above apron C at the upper end of the frame-work is a shorter apron, D, the object of which is to assist, by friction, to deliver the stalks to the stripping knives or rollers. I employ a stripping-frame, E, which is set in the frame-work just above the short apron D. This frame has a longitudinal slot, $e$, through which the stalks pass. This slot is of sufficient size to admit the passage of the stalks through it, but is intended to strip the ears from the stalks, and for this purpose the slot may have knife-edges. Just above this frame E, and at the outer end of the frame-work, are placed two rollers, F F, which rollers are geared so as to draw the stalks between them when revolved. Their principal function is to seize the stalks after they pass partially through the slot $e$ of frame E, and by pulling them through said slot to strip the ears off the stalks. I have also contemplated using these rollers alone for stripping the ears off the stalks, omitting frame E. The ears, after being severed from the stalks, fall into a chute, G, (shown in dotted lines in Fig. 4,) placed under the rear end of the frame-work carrying the apron C, and are deposited in a conveyer, H. This conveyer H is a box-like receptacle, and should be of such width that the ears of corn falling therein will not lie crosswise.

Passing through conveyer H is a link-belt, $h$, furnished with prongs or fingers $h'$. This belt is carried over transverse rollers set at each end of conveyer H; and its object is to move the ears of corn along the conveyer, presenting them to the husking-jaws. Conveyer H has slots or openings $i\,i$ made in one side thereof, and of sufficient size to admit of the passage through them of the husking-jaws, hereinafter described. A detail view of one pair of these jaws is shown in Fig. 6. The jaws move in a frame-work, I I, one end of which is fastened by a flange, $i^2$, to the conveyer H. The lower jaw, J, is flanged so as to slide in grooves in the frame-work I. It has an aperture cut through its center vertically, and through this aperture passes the arm of jaw J'. A crank-shaft, K, is carried in the outer end of frame-work I, and an arm is journaled to the bow of the crank-shaft at one end, and at the other is connected to the lower end of the arm of jaw J'. A number of pairs of these jaws may be provided, as shown in Fig. 5. The conveyer H and the crank-shaft K may be carried at an angle to the horizontal, so as to cause the corn falling into the conveyer to travel downward in obedience to gravity. A cross-carrier or elevator, L, is placed at the lower end of conveyer H to receive the corn and elevate it, or carry it to one side of the machine, where it is dropped into a wagon driven alongside the machine.

The machine is geared as follows: On the inside of wheel B is a spur-wheel, M, which imparts motion to a shaft, N, through a pinion, $n$. Shaft N extends across the machine, and on its outer end carries a bevel-pinion, $n'$. Bevel pinion $n'$ gears into a similar pinion, $o$, on the end of a shaft, O, carried in suitable boxing on the side of the frame-work. This shaft O carries on its outer end a combined sprocket and crank wheel, $o'$. A link-belt, P, is passed over sprocket $o'$ and over a pulley, $p'$, on the rear end of crank-shaft K, by which means the latter is turned, operating the husking-jaws. The aprons C D are operated by a belt, Q, which is passed over a sprocket, $q$, mounted on shaft N just inside of bevel-pinion $n'$, and over a similar sprocket mounted on the shaft over which apron C turns. A cog-wheel mounted on the shaft inside of sprocket $q$ meshes with a similar cog-wheel, $r$, on the shaft over which apron D passes. This cog-wheel $r$ gears with an intermediate pinion, S, and this in turn operates gear-wheels $s\ s'$, carried on the shafts of rollers F F, respectively. The sickle may be driven by any ordinary train of gearing; but I have provided a long pitman, T, pivoted on the under side of the frame-work at, say, one-third of the distance from the sickle to the ground-wheels, and carried in a sliding box at the rear. A short pitman, $t$, connects the outer end of pitman T with the crank-wheel $o'$, and the front end of pitman T is connected to the sickle.

In operation the machine is driven so that one row of corn is cut at a time. The stalks fall upon apron C, and are elevated by it, passing under apron D. The tops of the stalks pass through slot $e$ of frame E, when they are grasped by the rollers F F. These rollers seize the ends of the stalks and draw them through frame E, stripping off the ears. The ears fall into chute G, which deposits them upon belt $h$ at the upper end of conveyer H. This belt $h$ is operated by a chain-belt, U, passing over sprockets $u\ u'$, the latter being set upon shaft N, and carries the ears downward along conveyer H, passing perforations $i\ i$. The crank-shaft K advances the husking-jaws through said slots during a portion of its revolution. As the jaws are advanced the upper one is raised at its front end, thus permitting it to pass over the ear, while the under one passes under the ear and over the links of belt $h$. As the crank turns the jaws are withdrawn, the upper one gradually closing upon the ear, stripping off the husks. To assist in this work, the faces of the jaws may be provided with teeth or short spikes. The number of times which each ear is operated upon is regulated by the number of jaws and the relative speed of the crank-shaft and belt $h$. The corn, when husked, falls into a cross-carrier, L, which conveys it to one side of the machine and deposits it in a wagon driven by the side of the machine, or into any other proper receptacle. A conveying-belt may be used in cross-carrier L, and it may be operated by a chain-belt, W, passed over sprockets $w$ and $w'$, the latter carried on the outer end of crank-shaft K.

I claim—

1. In a corn-husking machine, the combination, with the aprons whereby the stalks are carried up to the stripping-frame, of a stripping-frame for severing the ears, oppositely-revolving rollers adapted to draw the stalks through said stripping-frame, and a chute for conveying the ears to the husking-trough, all substantially as described.

2. In a corn-husking machine, the combination, with a conveyer having slots or openings in the side thereof and a conveyer-chain, of husking-jaws, and means whereby they are reciprocated through said openings, all substantially as described, and for the purpose set forth.

3. In a corn-husking machine, the combination, with husking-jaws, one of which is pivoted upon the other, so that said jaws are alternately separated and closed, of means whereby said jaws are reciprocated, and means for presenting the ears of corn to said husking-jaws, all substantially as described, and for the purpose set forth.

4. In a corn-husking machine, the combination of the crank-shaft K K, jaws J J, conveyer H, and belt $h$, substantially as described, and for the purpose set forth.

JAMES A. NORTON.

Witnesses:
E. J. McGOWEN,
C. D. MILLER.